March 24, 1931.  V. M. WADE ET AL  1,797,382
REVOLUBLE PIPE JOINT
Filed Aug. 3, 1928   2 Sheets-Sheet 1
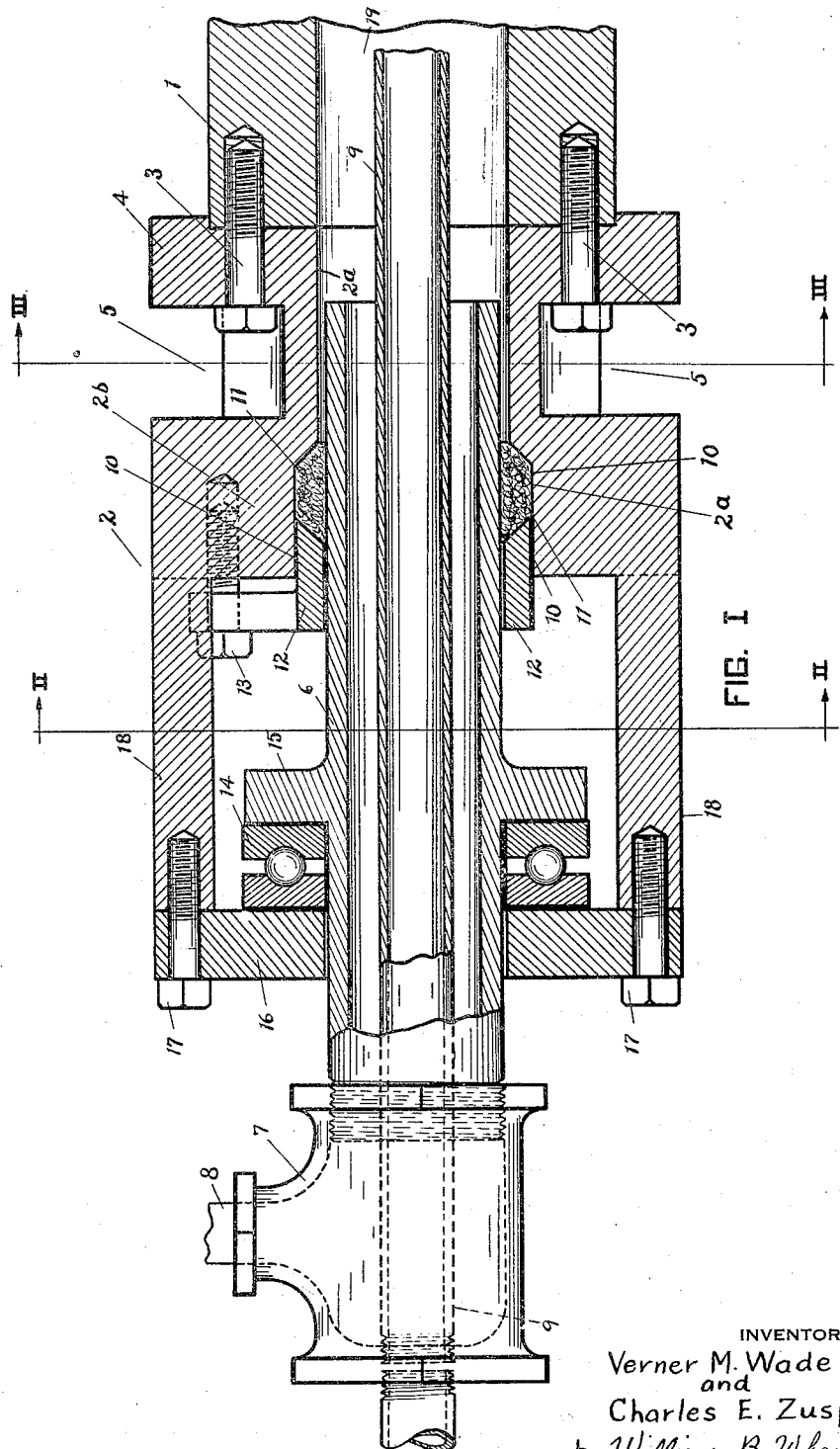
INVENTOR
Verner M. Wade
and
Charles E. Zuspan
by William B. Wharton
attorney March 24, 1931. V. M. WADE ET AL 1,797,382
REVOLUBLE PIPE JOINT
Filed Aug. 3, 1928 2 Sheets-Sheet 2
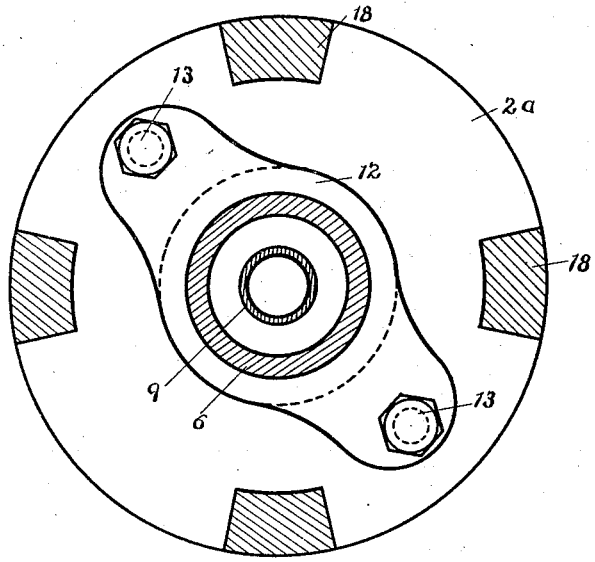
FIG. II
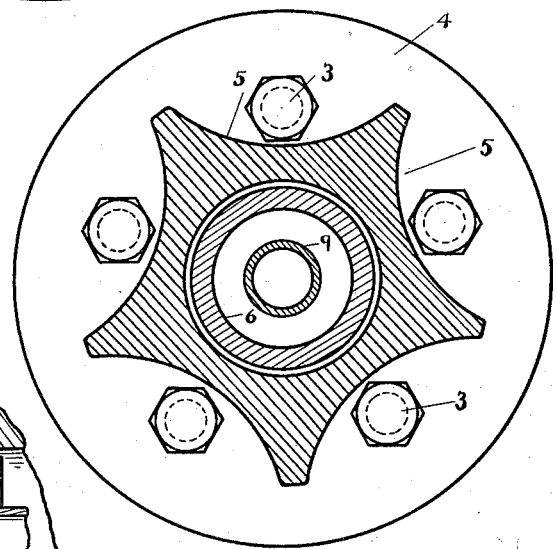
FIG. III
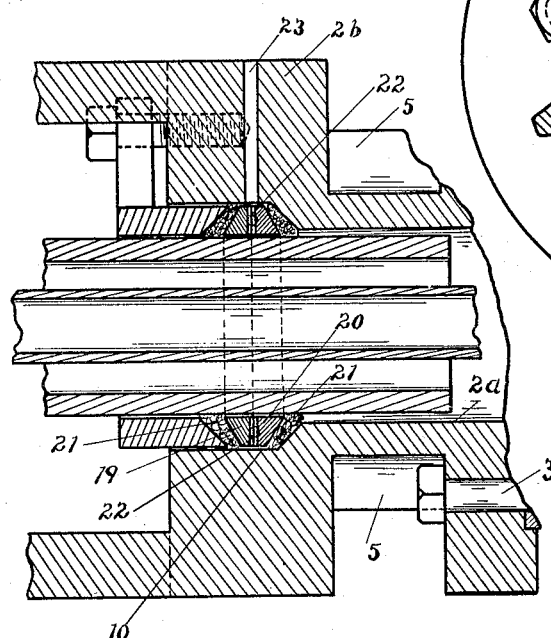
FIG. IV
INVENTOR
Verner M. Wade
and
Charles E. Zuspan
by William B. Wharton
attorney Patented Mar. 24, 1931

1,797,382

UNITED STATES PATENT OFFICE

VERNER M. WADE AND CHARLES E. ZUSPAN, OF FAIRMONT, WEST VIRGINIA, ASSIGNORS TO FAIRMONT BOX COMPANY, OF FAIRMONT, WEST VIRGINIA, A CORPORATION OF NEW YORK

REVOLUBLE PIPE JOINT

Application filed August 3, 1928. Serial No. 297,256.

This invention relates to a revoluble pipe joint, and particularly to a revoluble pipe joint adapted for use in paper corrugating machines and other machines in which the joint is subjected to considerable pressure exerted in such direction as to exert a thrust on the joint.

Revoluble pipe joints previously employed have either been lacking in an adequate thrust bearing, or the thrust bearing provided has been so positioned that it is subjected to the fluid within the inner tube of the joint. It is impossible to maintain proper lubrication in a bearing so positioned.

In previous forms of pipe joint, moreover, in which a thrust bearing is provided, the bearing prevents ready removal of packing which surrounds and seals off the inner pipe of the joint. When the pipe joint is used in conjunction with a corrugating roll of a paper corrugating machine, in which the packing is subjected to steam pressure and is in physical contact with steam, accessibility of the packing for frequent renewal is of great importance.

One object of the present invention is to provide a revoluble pipe joint in which a thrust bearing is so positioned that it wholly relieves the inner tube of the joint from end thrust or pressure, and so positioned that the bearing may be readily maintained in adequately lubricated condition, and may be readily inspected.

Another object of the invention is to provide a pipe joint so constructed that the inner tube of the pipe joint may be withdrawn from the structure without displacing the packing material of the joint.

Another object of the invention is to provide a revoluble pipe joint so constructed that access may be had to the packing material of the joint without wholly removing any element of the structure.

A still further object of the invention is to provide a revoluble pipe joint so constructed that danger of blowing the joint apart or blowing the packing out of the joint is wholly avoided.

In the accompanying drawings Figure I is a central longitudinal section through the revoluble pipe joint and a portion of the trunnion of the hot roll to which it is attached; Figure II is a cross sectional view taken on the line II—II of Fig. I; Figure III is a cross sectional view taken on the line III—III of Fig. I; and Figure IV is a fragmentary view showing in longitudinal section portions of the structure with packing means of modified form applied thereto.

In the drawings the reference numeral 1 designates the trunnion of a hot roll to which the pipe joint is attached, and 2 the body or casing member of the pipe joint. This body or casing member 2 is attached to the roll 1 by means of bolts 3, which pass through a flange 4 of the body member in spaces 5 formed therein for such purpose.

A flanged steam tube 6 is disposed centrally of the body member 2, and is attached at its outer end to a T connection 7 which is connected with a steam line 8. Steam entering this tube, by way of connection 7, passes therethrough into the hot roll 1 to heat the same. Passing through steam tube 6 is a drain off or siphoning tube 9, which draws off water formed by the condensation of steam in the hot roll.

Lying within a seat 10 in the bore 2a of the peripherally continuous and relatively thick walled portion 2b of the body member, and surrounding steam tube 6, is packing material 11 which prevents leakage of steam delivered by the steam tube. This packing material is held and compressed by means of a gland 12, which is secured to the portion 2b of the body member by means of bolts 13.

The thrust bearing of the structure consists of a ball bearing 14, which lies between a flange 15 on the steam tube and a cap member 16. The cap member is secured by means of bolts 17 to the longitudinally extending and mutually spaced frame members 18 formed integral with the portion 2b of the body.

With the revoluble pipe joint in position, as shown, steam passes by way of the T connection 7, and steam tube 6, to the bore 19 of the hot roll 1, and being condensed, is drawn off by siphoning tube 9. As escape of steam is prevented by packing material 11, the steam pressure exerts a thrust on the steam tube 6 tending to force it outwardly from the body member. With high pressure steam, as is used in rolls for paper corrugating machines, this pressure exerts a force producing a relatively great thrust. This thrust, however, is born by the ball bearing 14 which lies between the flange 15 on the steam tube 6 and the cap 16 of the body member 2, which serves as a stop or thrust member for the bearing.

The thrust, being thus transmitted to bearing 14, does not tend to produce a binding of the parts during rotation of the body member. The thrust is also exerted along steam tube 6, interiorly of packing material 11, so that there is no tendency to disarrange or displace the packing material. Because of the position of the bearing 14, it may be inspected and lubricated through the spaces existing between the longitudinal frame members 18 of the body member 2. Even though the periphery of the body member were made continuous, access to bearing 14, for inspection and lubrication of the same, might be obtained by merely removing the cap or cover plate 16. It will also be noted that the bearing, while constituting an intimate part of the pipe joint structure, is wholly removed from the steam zone thereof.

It will be readily observed that the siphoning tube 9 may be withdrawn from its position within steam tube 6 and body member 1 without removing either the steam tube or the body member 1, or disturbing the packing material 11. The packing material 11 may be removed, and fresh packing material inserted, by a simple operation. For this purpose, bolts 13 holding packing gland 12 to body member are withdrawn, and the gland slipped outwardly along steam tube 6 until arrested by the flange 15 thereon. With the packing gland thus withdrawn, any suitable instrument may be inserted in the intervals between the longitudinal frame members 18 for the purpose of picking out the old packing material and pushing fresh packing material into the seat 10.

It will be further noted that the packing material of the joint is not subjected to great thrusting force. There is no possibility that the packing material and packing gland may be blown from the pipe joint, because of improper fastening of the bolts 13 or excessive pressure within the pipe joint and hot roll. As has been said above, steam pressure for the hot roll of a paper corrugating machine is always high, and may readily become excessive. Under such circumstances, discharge of the packing gland will be prevented by flange 15 on steam tube 6, and by the cap or cover plate 16.

In the modification of Figure IV two metallic rings 19 and 20 are inserted between two bodies 21 of packing material in the seat 10. These rings are provided with oil grooves 22 for leading oil from an oil port 23 in the solid portion 2b of body member 2, for their own lubrication and that of the under surface of the packing material.

What I claim is:

1. In a revoluble pipe-joint for steam heated rolls, a body member having a peripheral portion with an opening therethrough for a fixed steam inlet-tube and a seat for packing material in said opening, a flange integral with and arranged on one side of said peripheral portion to be fixed against the trunnion of a hollow roll, spaced frame members integral with and extending on the other side of said peripheral portion, an end member secured to the extending frame members, a collar on said steam inlet tube and means between said collar and said end member for withstanding thrust which tends to move said inlet tube outwardly from said body member.

2. A revoluble pipe-joint for steam heated rolls including a body member in which a fixed steam inlet tube is maintained with packing material between it and the body member, said body member comprising a portion with a packing seat therein and having frame members integral therewith and extending therefrom, a flange integral with said portion of the body member, which flange is adapted to be secured against the trunnion of a hollow roll, an end member secured to the extending ends of said frame members, a collar on said inlet tube, and an anti-friction bearing between said end member and said collar, which bearing is adapted to withstand thrust tending to move said inlet tube outwardly from said body member.

3. The structure of the next preceding claim, together with a condensate outlet tube lying within said steam inlet tube.

In witness whereof, we hereunto set our hands.

VERNER M. WADE.
CHARLES E. ZUSPAN.